United States Patent
Murakami et al.

(10) Patent No.: US 6,891,018 B2
(45) Date of Patent: May 10, 2005

(54) ETHYLENE COPOLYMER AND USES THEREOF

(75) Inventors: Hidetatsu Murakami, Sodegaura (JP); Mamoru Takahashi, Sodegaura (JP); Shigenobu Ikenaga, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/088,917

(22) PCT Filed: Jul. 24, 2001

(86) PCT No.: PCT/JP01/06376

§ 371 (c)(1), (2), (4) Date: Mar. 25, 2002

(87) PCT Pub. No.: WO02/08305

PCT Pub. Date: Jan. 31, 2002

(65) Prior Publication Data

US 2003/0008997 A1 Jan. 9, 2003

(30) Foreign Application Priority Data

Jul. 26, 2000 (JP) ........................................ 2000-225759

(51) Int. Cl.⁷ .............................................. C08G 61/04
(52) U.S. Cl. ........................ 528/396; 525/240; 526/905
(58) Field of Search ......................................... 526/348

(56) References Cited

U.S. PATENT DOCUMENTS

| | | | | |
|---|---|---|---|---|
| 3,981,849 A | * | 9/1976 | Frese et al. | 526/82 |
| 4,349,648 A | | 9/1982 | Jorgensen et al. | |
| 4,988,783 A | * | 1/1991 | Beran et al. | 526/129 |
| 5,096,955 A | * | 3/1992 | Johnston et al. | 524/398 |
| 5,773,106 A | | 6/1998 | deGroot et al. | 428/35.7 |
| 6,025,448 A | | 2/2000 | Swindoll et al. | 526/127 |
| 6,444,773 B1 | * | 9/2002 | Markel | 526/348 |
| 2003/0008997 A1 | * | 1/2003 | Murakami et al. | 526/348 |

FOREIGN PATENT DOCUMENTS

| | | | |
|---|---|---|---|
| EP | 416815 A2 | 3/1991 | |
| EP | 0 667 359 A1 | 8/1995 | |
| EP | 0 683 184 A1 | 11/1995 | |
| EP | 0 690 079 A1 | 1/1996 | |
| EP | 1 264 848 A1 | * 12/2002 | ......... C08F/210/02 |
| JP | 6-298825 A | 10/1994 | |
| JP | 6-298825 A | 10/1994 | |
| JP | 11-60632 A | 3/1999 | |
| JP | 11-060632 A | * 3/1999 | ........... C08F/10/02 |
| JP | 11-106429 A | * 4/1999 | ........... C08F/10/02 |
| JP | 2000-239457 A | 9/2000 | |
| JP | 2001-151828 A | 6/2001 | |

OTHER PUBLICATIONS

L. P. Lindeman et al., Analytical Chemistry, vol. 43, No. 10, (Aug. 1971), pp.1245–1252.

James C. Randall, Review Macromolecular Chemistry Physics, vol. C29, No. (2 & 3), (1989), pp.201–317.

* cited by examiner

*Primary Examiner*—David W. Wu
*Assistant Examiner*—Rip A. Lee
(74) *Attorney, Agent, or Firm*—Birch, Stewart, Kolasch & Birch, LLP

(57) ABSTRACT

An ethylene copolymer is provided which is a copolymer of ethylene and an α-olefin of 3 to 20 carbon atoms and has the following properties:

(a) the melt index (MI2) at 190° C. under a load of 2.16 kg is in the range of 0.0001 to 1000 g/10 min, (b) the density is not more than 0.899 g/cm³, (c) the relationship between a vinyl group amount and MI2 of the polymer satisfies the following expression:

(vinyl group amount: number of vinyl groups/1000 carbon atoms)$\leq 0.004509+0.000815 \times \log(MI2)$, and (d) the relationship between a vinylidene group amount and MI2 of the polymer satisfies the following expression:

(vinylidene group amount: number of vinylidene groups/1000 carbon atoms)$\leq 0.013528+0.002445 \times \log(MI2)$.

22 Claims, No Drawings

ETHYLENE COPOLYMER AND USES THEREOF

This application is the national phase under 35 U.S.C. § 371 of PCT International Application No. PCT/JP01/06376 which has an International filing date of Jul. 24, 2001, which designated the United States of America.

TECHNICAL FIELD

The present invention relates to novel ethylene copolymers and a process for preparing the same. More particularly, the invention relates to ethylene copolymers excellent in mechanical properties, molding processability and heat stability in the molding process.

BACKGROUND ART

Polyolefins such as ethylene/α-olefin copolymers are economically advantageous and are widely used in various molding methods such as extrusion molding or as resin modifiers. Although the ethylene/α-olefin copolymers have excellent properties, they are still desired to be improved in heat resistance, particularly heat aging resistance.

Under such circumstances, the present inventors have found that in the ethylene/α-olefin copolymers, a great number of double bonds remain at the ends of the copolymers, and the double bonds have influences on the heat resistance of the polymers. The present inventors have earnestly studied for the purpose of improving heat aging resistance with keeping the excellent properties, and as a result, they have found that an ethylene/α-olefin copolymer which is controlled to have a specific amount of double bonds in the copolymer main chain and has a specific density is an excellent ethylene/α-olefin copolymer capable of solving all of the above problems. Based on the finding, the present invention has been accomplished.

In Japanese Patent Laid-Open Publication No. 60632/1999, there is disclosed an ethylene polymer which is an ethylene homopolymer or a copolymer of ethylene and an α-olefin of 3 to 20 carbon atoms and has the properties: (A) the melt index at 190° C. under a load of 2.16 kg is in the range of 0.0001 to 1000 g/10 min, (B) the density is in the range of 0.90 to 0.985 g/cm$^3$, (C) the molecular weight distribution, as measured by gel permeation chromatography, is in the range of 3 to 7, (D) the number of vinyl groups present at the molecular ends of the polymer is not more than 0.02 (vinyl group/1000 carbon atoms), (E) the number of vinylidene groups present at the molecular ends of the polymer is not more than 0.02 (vinylidene group/1000 carbon atoms), and (F) the zirconium content is not more than 10 ppb. This polymer, however, is not suitable as a impact strength modifier because of high density, and has poor transparency and poor heat-sealing properties.

OBJECT OF THE INVENTION

It is an object of the present invention to provide an ethylene copolymer excellent in mechanical properties, molding processability, heat stability in the molding process and heat aging resistance.

DISCLOSURE OF THE INVENTION

The ethylene copolymer according to the invention is a copolymer (A-1) of ethylene and an α-olefin of 3 to 20 carbon atoms and has the following properties:
(a) the melt index (MI2) at 190° C. under a load of 2.16 kg is in the range of 0.0001 to 1000 g/10 min,
(b) the density is not more than 0.899 g/cm$^3$,
(c) the relationship between a vinyl group amount and MI2 of the polymer satisfies the following expression (c):

$$\text{(vinyl group amount: number of vinyl groups/1000 carbon atoms)} \leq 0.018038 + 0.003259 \times \log(MI2) \quad (c),$$

and
(d) the relationship between a vinylidene group amount and MI2 of the polymer satisfies the following expression (d):

$$\text{(vinylidene group amount: number of vinylidene groups/1000 carbon atoms)} \leq 0.018038 + 0.003259 \times \log(MI2) \quad (d).$$

The ethylene copolymer (A-1) preferably further has the following properties:
(C-1) the relationship between a vinyl group amount and MI2 of the polymer satisfies the following expression (c-1):

$$\text{(vinyl group amount: number of vinyl groups/1000 carbon atoms)} \leq 0.004509 + 0.000815 \times \log(MI2) \quad (c-1),$$

and
(D-1) the relationship between a vinylidene group amount and MI2 of the polymer satisfies the following expression (d-1):

$$\text{(vinylidene group amount: number of vinylidene groups/1000 carbon atoms)} \leq 0.013528 + 0.002445 \times \log(MI2) \quad (d-1).$$

The ethylene copolymer according to the invention is a copolymer (A-2) of ethylene and an α-olefin of 3 to 20 carbon atoms and has the following properties:
(a) the melt index (MI2) at 190° C. under a load of 2.16 kg is in the range of 0.0001 to 1000 g/10 min,
(b) the density is in the range of 0.875 to 0.899 g/cm$^3$, and
(c) the relationship between a vinyl group amount and MI2 of the polymer satisfies the following expression (c):

$$\text{(vinyl group amount: number of vinyl groups/1000 carbon atoms)} \leq 0.018038 + 0.003259 \times \log(MI2) \quad (c).$$

The ethylene copolymer (A-2) preferably further has the following properties:
(c-1) the relationship between a vinyl group amount and MI2 of the polymer satisfies the following expression (c-1):

$$\text{(vinyl group amount: number of vinyl groups/1000 carbon atoms)} \leq 0.004509 + 0.000815 \times \log(MI2) \quad (c-1).$$

The ethylene copolymer according to the invention is a copolymer (A-3) of ethylene, an α-olefin of 3 to 20 carbon atoms and a cycloolefin and has the following properties:
(a) the cycloolefin content is not less than 0.01% by mol,
(b) the melt index (MI2) at 190° C. under a load of 2.16 kg is in the range of 0.0001 to 1000 g/10 min,
(c) the relationship between a vinyl group amount and MI2 of the polymer satisfies the following expression (c):

$$\text{(vinyl group amount: number of vinyl groups/1000 carbon atoms)} \leq 0.018038 + 0.003259 \times \log(MI2) \quad (c),$$

and (d) the relationship between a vinylidene group amount and MI2 of the polymer satisfies the following expression (d):

(vinylidene group amount: number of vinylidene groups/1000 carbon atoms)≤0.018038+0.003259×log(MI2)　　(d)

The ethylene copolymer (A-3) preferably further has the following properties:

(c-1) the relationship between a vinyl group amount and MI2 of the polymer satisfies the following expression (c-1)

(vinyl group amount: number of vinyl groups/1000 carbon atoms)≤0.004509+0.000815×log(MI2)　　(c-1), and (d-1) the relationship between a vinylidene group amount and MI2 of the polymer satisfies the following expression (d-1):

(vinylidene group amount: number of vinylidene groups/1000 carbon atoms)≤0.013528+0.002445×log(MI2)　　(d-1).

In the ethylene copolymers (A-1) to (A-3), regioregularity of the α-olefin of 3 to 20 carbon atoms, as measured by $^{13}$C-NMR, preferably satisfies the following expression (e-1):

$T\alpha\beta/(T\alpha\beta+T\alpha\alpha) \leq 0.25-0.0020 \times x$　　(e-1)

wherein $T\alpha\beta$ is a peak intensity of a carbon atom having branches at the α-position and the β-position in the $^{13}$C-NMR spectrum, $T\alpha\alpha$ is a peak intensity of a carbon atom having branches at both of the α-positions, and x is an ethylene content (% by mol) in the polymer.

In the ethylene copolymers (A-1) to (A-3), further, regioregularity of the α-olefin of 3 to 20 carbon atoms, as measured by $^{13}$C-NMR, preferably satisfies the following expression (e-2):

$T\beta\gamma/(T\beta\gamma+T\beta\beta) \leq 0.30-0.0015 \times x$　　(e-2)

wherein $T\beta\gamma$ is a peak intensity of a carbon atom having branches at the β-position and the γ-position in the $^{13}$C-NMR spectrum, $T\beta\beta$ is a peak intensity of a carbon atom having branches at both of the β-positions, and x is an ethylene content (% by mol) in the polymer.

The molecular weight distribution (Mw/Mn) of each of the ethylene copolymers (A-1) to (A-3), as measured by GPC, is desired to be in the range of 1.2 to 10, preferably 1.6 to 10.

The ethylene copolymer preferably satisfies the relational expression MI10/MI2<(Mw/Mn)+5.55. The ethylene copolymer preferably further satisfies the relational expression $MI2>19.009 \times (\eta)^{-5.2486}$.

The ash content in each of the ethylene copolymers (A-1) to (A-3) is preferably not more than 1000 ppm.

The titanium element content and/or the zirconium element content in each of the ethylene copolymers (A-1) to (A-3) is not more than 10 ppm.

The ethylene copolymers (A-1) to (A-3) are each preferably a copolymer prepared without contact of the reaction solution with water and/or an alcohol in an amount of not less than 1/10 of the weight of the copolymer in a solution state or a semi-precipitation state.

The ethylene copolymers (A-1) to (A-3) are each preferably a copolymer prepared by forming not less than 50% of chain transfer by the addition of hydrogen molecules.

In the preparation of the ethylene copolymer, it is preferable that the reaction solution is not contacted with water and/or an alcohol in an amount of not less than 1/10 of the weight of the copolymer in a solution state or a semi-precipitation state.

The molded product according to the invention comprises the ethylene copolymer or a composition containing the ethylene copolymer. The resin modifier according to the invention comprises the ethylene copolymer.

BEST MODE FOR CARRYING OUT THE INVENTION

The ethylene copolymer according to the invention and the process for preparing the same are described in detail hereinafter.

The ethylene copolymer of the invention comprises the following copolymer (A-1), (A-2) or (A-3) of ethylene and an α-olefin of 3 to 20 carbon atoms (sometimes referred to as an "ethylene copolymer" simply hereinafter in the present specification).

Ethylene Copolymer (A-1)

The ethylene copolymer (A-1) is a copolymer of ethylene and an α-olefin of 3 to 20 carbon atoms. Examples of the α-olefins of 3 to 20 carbon atoms include propylene, butene-1, pentene-1, 3-methyl-butene-1, hexene-1, 4-methyl-pentene-1, octene-1, decene-1, tetradecene-1, hexadecene-1, octadecene-1 and eicosene-1. Also employable are vinyl compounds, such as vinylcyclohexane, styrene and derivatives thereof. This ethylene copolymer may be a copolymer optionally containing a small amount of a non-conjugated polyene such as 1,5-hexadiene or 1,7-octadiene. Of the α-olefins, preferable are α-olefins of 4 to 20 carbon atoms, and more preferable are α-olefins of 5 to 20 carbon atoms. Not only when these α-olefins are used singly but also when they are used as a blend with other resins, the resulting copolymer has excellent strength and has particularly excellent low-temperature brittle temperature and tensile elongation.

In the ethylene copolymer (A-1), although the amount of recurring units derived from ethylene (ethylene content) is not specifically restricted, provided that the density is in the later-described range, the ethylene content is in the range of usually 50 to 97% by mol, preferably 50 to 95% by mol, more preferably 50 to 93% by mol, still more preferably 55 to 93% by mol, particularly preferably 60 to 92% by mol. The residues are recurring units derived from an α-olefin of 3 to 20 carbon atoms.

The ethylene content in the ethylene copolymer is measured by $^{13}$C-NMR in accordance with the method described in "Polymer Analysis Handbook" (Society for Japanese Analytical Chemistry, edited by Polymer Analysis Research Gathering, issued by Kinokuniya Shoten).

The ethylene copolymer (A-1) satisfies the following conditions (a) to (d).

(a) Melt Index

The melt index (referred to as "MI2" hereinafter) of the ethylene copolymer (A-1) at 190° C. under a load of 2.16 kg is in the range of 0.0001 to 1000 g/10 min. The upper limit of MI2 is preferably not more than 500, and the lower limit thereof is preferably not less than 0.01. For example, MI2 is in the range of 0.001 to 500 g/10 min, more preferably 0.01 to 500 g/10 min.

When MI2 is in the above range, a molded product having high strength can be produced. MI2 is measured in accordance with ASTM D1238.

(b) Density

The upper limit of the density of the ethylene copolymer (A-1) is not more than 0.899 g/cm³, preferably not more than 0.895 g/cm$^3$, more preferably not more than 0.894 g/cm$^3$. Although the lower limit of the density is not specifically restricted, it is usually not less than 0.850 g/cm$^3$, preferably not less than 0.855 g/cm$^3$. For example, the density is not more than 0.899 g/cm$^3$, preferably 0.899 to 0.850 g/cm$^3$, more preferably 0.895 to 0.855 g/cm$^3$.

An ethylene polymer having a density of more than 0.899 g/cm$^3$ has a high crystallinity and is sometimes unsuitable as an impact strength modifier, while an ethylene polymer having a density of not more than 0.899 g/cm$^3$ similarly to the present invention has a low crystallinity and is employable as an impact strength modifier. The density is measured by a method shown in the later-described example.

(c) Vinyl Group Amount of Polymer

In the ethylene copolymer (A-1) of the invention, the relationship between a vinyl group amount and MI2 of the polymer satisfies the following expression:

(vinyl group amount: number of vinyl groups/1000 carbon atoms)≦0.018038+0.003259×log(MI2)    (c), preferably the following expression:

(vinyl group amount: number of vinyl groups/1000 carbon atoms)≦0.004509+0.000815×log(MI2)    (c-1).

If the vinyl group amount is larger than the above range, vinyl groups are contained in the polymer in a large amount, that is, the content of the terminal vinyl groups becomes high, and hence crosslinking or breakage of the polymer main chain is liable to take place in the hot molding process, sometimes resulting in occurrence of problems such as variation of MI2 and burning in the fabrication process. The vinyl groups are usually present at the ends of a polymer.

The vinyl group amount is more preferably not more than the detection limit (detection limit: less than 0.002 vinyl group/1000 carbon atoms) when measured by the below-described method.

The quantitative determination of the vinyl group was made in the following manner using an infrared spectrophotometer FT-IR 350 type manufactured by Nippon Bunko.

A powder of polyethylene (HZ2200J, available from Mitsui Chemicals, Inc.) containing neither vinyl type unsaturated bond nor vinylidene type unsaturated bond, and 1,2-polybutadiene (double bond amount of which was already known, BR830, available from JSR) as a vinyl group type olefin were used as standard materials. Each sample of about 5 g was weighed down to the fourth decimal place, and both of the samples were dissolved in chloroform at 23° C., followed by evaporating chloroform, to obtain a mixed sample. From the mixed sample, an infrared absorption measuring film was prepared by hot calendering at 180° C. The vinyl group content in BR830 available from JSR is 93% by mol (catalogue value), and using this value, the number of vinyl type double bonds in the 1,2-polybutadiene based on 1000 carbon atoms can be calculated. Then, samples changed in the mixing ratio between polyethylene and the vinyl type olefin and having the different numbers of vinyl type double bonds (n: number of terminal vinyl groups based on 1000 carbon atoms) were each subjected to 5-level infrared absorption measurement in the n range of 0.05 to 1, to obtain a common tangent line at the maximum point in the vicinity of 940 to 850 cm$^{-1}$. The common tangent line was taken as a base line, and the absorbance Ds at the key band (910 cm$^{-1}$) of the vinyl group and the value D$_0$ of the base line were read out. Further, the thickness L (cm) of each sample was accurately read out by a micrometer, and the absorbance D/L of each sample based on the unit thickness of the key band was calculated from the formula D/L=(Ds−D$_0$)/L. Then, a relationship between the absorbance and the number n of the vinyl type double bonds is graphically represented to obtain a calibration curve for the vinyl group amount based on 1000 carbon atoms.

Also from the sample to be measured, an infrared absorption measuring film was prepared by hot calendering, and D/L was determined in the same manner as described above. Using the above-obtained calibration curve, the vinyl group amount based on 1000 carbon atoms was calculated.

(d) Vinylidene group amount of polymer

In the ethylene copolymer (A-1) of the invention, the relationship between a vinylidene group amount and MI2 of the polymer satisfies the following expression:

(vinylidene group amount: number of vinylidene groups/1000 carbon atoms)≦0.018038+0.003259×log(MI2)    (d), preferably the following expression:

(vinylidene group amount: number of vinylidene groups/1000 carbon atoms)≦0.013528+0.002445×log(MI2)    (d-1).

If the vinylidene group amount is larger than the above range, vinylidene groups are contained in the polymer in a large amount, that is, the content of the terminal vinylidene groups becomes high, and hence crosslinking or breakage of the polymer main chain is liable to take place in the hot molding process, sometimes resulting in occurrence of problems such as variation of MI2 and burning in the fabrication process. The vinylidene groups are usually present at the ends of a polymer.

The quantitative determination of the vinylidene group was made in the following manner using an infrared spectrophotometer FT-IR 350 type manufactured by Nippon Bunko. From the sample to be measured, an infrared absorption measuring film was prepared by hot calendering at 180° C., and the absorbance Ds at the key band (890 cm$^{-1}$) of the vinylidene group and the value D$_0$ of the base line were read out. Further, the thickness L (cm) of each sample was accurately read out by a micrometer, and the absorbance D/L of each sample based on the unit thickness of the key band was calculated from the formula D/L=(Ds−D$_0$)/L. Based on the obtained D/L value, the number of vinylidene groups was calculated from the following formula:

$$n=(k1 \times D)/(a \times k2 \times L)$$

wherein n is the number of vinylidene groups (vinylidene groups/1000 carbon atoms), a is a coefficient of a vinyl group, k1 is a molecular absorptivity coefficient at 910 cm$^{-1}$ of the vinyl group-containing model compound, and k2 is a molecular absorptivity coefficient at 890 cm$^{-1}$ of the vinylidene group-containing model compound. As the coefficient, (a×k1)/k1=11.2 was used. This value was obtained by the use of 1-hexadecene as the vinyl group-containing model compound and 2,4,4-trimethyl-2-pentene as the vinylidene group-containing model compound.

Ethylene Copolymer (A-2)

The ethylene copolymer (A-2) is a copolymer of ethylene and an α-olefin of 3 to 20 carbon atoms. Examples of the α-olefins of 3 to 20 carbon atoms include the same α-olefins as previously described with respect to the ethylene copolymer (A-1).

In the ethylene copolymer (A-2), the amount of recurring units derived from ethylene (ethylene content) is not specifically restricted, provided that the density is in the later-described range, but the ethylene content is in the range of usually 80 to 95% by mol, preferably 82 to 95% by mol, more preferably 85 to 93% by mol. The residues are recurring units derived from an α-olefin of 3 to 20 carbon atoms.

The ethylene copolymer (A-2) satisfies the following conditions (a) to (c).

(a) Melt Index

The melt index (referred to as "MI2" hereinafter) of the ethylene copolymer (A-2) at 190° C. under a load of 2.16 kg is in the range of 0.0001 to 1000 g/10 min. The upper limit of MI2 is preferably not more than 500, and the lower limit thereof is preferably not less than 0.01. For example, MI2 is in the range of preferably 0.001 to 500 g/10 min, more preferably 0.01 to 500 g/10 min. When MI2 is in the above range, a molded product having high strength can be produced. MI2 is measured in accordance with ASTM D1238.

(b) Density

The upper limit of the density of the ethylene copolymer (A-2) is not more than 0.899 g/cm$^3$, preferably not more than 0.895 g/cm$^3$, more preferably not more than 0.894 g/cm$^3$. The lower limit of the density is not less than 0.875 g/cm$^3$, preferably not less than 0.880 g/cm$^3$, more preferably not less than 0.885 g/cm$^3$. For example, the density is in the range of 0.875 to 0.899 g/cm$^3$, preferably 0.880 to 0.899 g/cm$^3$, more preferably 0.885 to 0.895 g/cm$^3$. When the density is in the above range, the copolymer has a good balance between rigidity and impact strength. An ethylene polymer having a density of more than 0.899 g/cm$^3$ has high rigidity but sometimes shows low impact strength. When the density is not less than 0.875 g/cm$^3$, the copolymer shows sufficient rigidity and is suitable for single use. The density is measured in the same manner as used for the ethylene copolymer (A-1).

(c) Vinyl Group Amount of Polymer

In the ethylene copolymer (A-2) of the invention, the relationship between a vinyl group amount and MI2 of the polymer satisfies the following expression (c):

(vinyl group amount: number of vinyl groups/1000 carbon atoms)≦0.018038+0.003259×log(MI2)　　　(c), preferably the following expression (c-1):

(vinyl group amount: number of vinyl groups/1000 carbon atoms)≦0.004509+0.000815×log(MI2)　　　(c-1).

If the vinyl group amount is larger than the above range, vinyl groups are contained in the polymer in a large amount, that is, the content of the terminal vinyl groups becomes high, and hence crosslinking or breakage of the polymer main chain is liable to take place in the hot molding process, sometimes resulting in occurrence of problems such as variation of MI2 and burning in the fabrication process. The vinyl groups are usually present at the ends of a polymer. The quantitative determination of the vinyl group is made in the same manner as used for the ethylene copolymer (A-1).

Ethylene Copolymer (A-3)

The ethylene copolymer (A-3) of the invention is a copolymer of ethylene, an α-olefin of 3 to 20 carbon atoms and a cycloolefin. Examples of the α-olefins of 3 to 20 carbon atoms include the same α-olefins as previously described with respect to the ethylene copolymer (A-1). Examples of the cycloolefins include cycloolefins of 4 to 20 carbon atoms, such as cyclopentene, cycloheptene, norbornene, 5-methyl-2-norbornene, tetracyclododecene and 2-methyl-1,4,5,8-dimethano-1,2,3,4,4a,5,8,8a-octahydronaphthalene.

The ethylene copolymer (A-3) satisfies the following conditions (a) to (d).

(a) Cycloolefin Content

In the ethylene copolymer (A-3), the amount of recurring units derived from the cycloolefin (cycloolefin content) is not less than 0.1% by mol, preferably 0.1 to 70% by mol, more preferably 0.5 to 70% by mol, still more preferably 1 to 50% by mol, particularly preferably 1 to 40% by mol. In the ethylene copolymer (A-3), the amount of recurring units derived from ethylene and the α-olefin is in the range of usually 1 to 99.9% by mol, preferably 30 to 99.9% by mol, more preferably 30 to 99.5% by mol, still more preferably 50 to 99% by mol, particularly preferably 60 to 99% by mol. The molar ratio between ethylene and the α-olefin of 3 to 20 carbon atoms (ethylene:α-olefin of 3 to 20 carbon atoms) is in the range of 99.9:0.1 to 10:90, preferably 99.9:0.1 to 50:50, more preferably 99.9:0.1 to 70:30.

The cycloolefin content in the ethylene copolymer is measured by $^{13}$C-NMR in accordance with the method described in "Polymer Analysis Handbook" (Society for Japanese Analytical Chemistry, edited by Polymer Analysis Research Gathering, issued by Kinokuniya Shoten).

(b) Melt Index

The melt index (MI2) of the ethylene copolymer (A-3) at 190° C. under a load of 2.16 kg is in the range of 0.0001 to 1000 g/10 min. The upper limit of MI2 is preferably not more than 500, and the lower limit thereof is preferably not less than 0.01. For example, MI2 is in the range of 0.001 to 500 g/10 min, more preferably 0.01 to 500 g/10 min. When MI2 is in the above range, a molded product having high strength can be produced.

(c) Vinyl Group Amount of Polymer

In the ethylene copolymer (A-3) of the invention, the relationship between a vinyl group amount and MI2 of the polymer satisfies the following expression:

(vinyl group amount: number of vinyl groups/1000 carbon atoms)≦0.018038+0.003259×log(MI2)　　　(c), preferably the following expression:

(vinyl group amount: number of vinyl groups/1000 carbon atoms)≦0.004509+0.000815×log(MI2)　　　(c-1).

If the vinyl group amount is larger than the above range, vinyl groups are contained in the polymer in a large amount, that is, the content of the terminal vinyl groups becomes high, and hence crosslinking or breakage of the polymer main chain is liable to take place in the hot molding process, sometimes resulting in occurrence of problems such as variation of MI2 and burning in the fabrication process. The vinyl groups are usually present at the ends of a polymer. The quantitative determination of the vinyl group was made in the same manner as used for the ethylene copolymer (A-1).

(d) Amount of Vinylidene Groups Present at the Ends of Polymer

In the ethylene copolymer (A-3) of the invention, the relationship between a vinylidene group amount and MI2 of the polymer satisfies the following expression:

(vinylidene group amount: number of vinylidene groups/1000 carbon atoms)≦0.018038+0.003259×log(MI2)　　　(d), preferably the following expression:

(vinylidene group amount: number of vinylidene groups/1000 carbon atoms)≦0.013528+0.002445×log(MI2)　　　(d-1).

If the vinylidene group amount is larger than the above range, vinylidene groups are contained in the polymer in a large amount, that is, the content of the terminal vinylidene groups becomes high, and hence crosslinking or breakage of the polymer main chain is liable to take place in the hot molding process, sometimes resulting in occurrence of problems such as variation of MI2 and burning in the fabrication process. The vinylidene groups are usually present at the ends of a polymer. The quantitative determination of the vinylidene group was made in the same manner as used for the ethylene copolymer (A-1).

Variation of MI2 of the copolymers (A-1) to (A-3) in the molding process, that is an indication of heat stability, can be ascertained in the following manner. To an ethylene polymer, 10 ppm of Irganox 1010 is added, and the mixture is granulated by a single screw extruder at 190° C. The resulting pellets are further granulated ten times at 300° C. Then, MI2 is measured, and based on the degree of variation of MI2, the heat stability is evaluated.

It is also possible to evaluate the heat stability by passing a MI meter ten times at 300° C.

Although there is no specific limitation on the density of the ethylene copolymer (A-3), the density is in the range of 0.850 to 1.100 g/cm$^3$, and is desired to be not more than 0.899 g/cm$^3$, preferably not more than 0.895 g/cm$^3$, more preferably not more than 0.894 g/cm$^3$. A density of not less than 0.986 g/cm$^3$ is also preferable. For example, the density is preferably in the range of 0.855 to 0.899 g/cm$^3$ or 0.986 to 1.100 g/cm$^3$.

In the ethylene copolymers (A-1) to (A-3), the regio-regularity of the α-olefin of 3 to 20 carbon atoms, as measured by $^{13}$C-NMR, preferably satisfies the following expression (e-1):

$$T\alpha\beta/(T\alpha\beta+T\alpha\alpha) \leq 0.25-0.0020 \times x \qquad (e\text{-}1)$$

wherein Tαβ is a peak intensity of a carbon atom having branches at the α-position and the β-position in the $^{13}$C-NMR spectrum, Tαα is a peak intensity of a carbon atom having branches at both of the α-positions, and x is an ethylene content (% by mol) in the polymer.

That is to say, Tαβ and Tαα in the $^{13}$C-NMR spectrum are each a peak intensity of CH$_2$ in the constituent unit derived from an α-olefin of 4 or more carbon atoms, and they mean two kinds of CH$_2$ which are different in positions to the tertiary carbon, as described below.

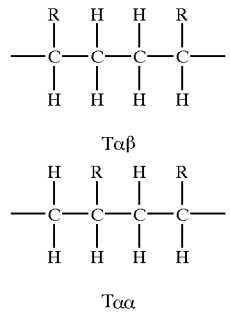

The Tαβ/(Tαβ+Tαα) intensity ratio can be determined in the following manner.

A $^{13}$C-NMR spectrum of the ethylene/α-olefin copolymer is measured by, for example, a JOEL-GX270 NMR measuring apparatus manufactured by Japan Electron Optics Laboratory Co., Ltd. The measurement is carried out using a mixed solution of hexachlorobutadiene and d6-benzene (hexachlorobutadiene/d6-benzene=½ by volume) adjusted to a sample concentration of 5% by weight, under the conditions of 67.8 MHz, 25° C. and d6-benzene (128 ppm) basis. The $^{13}$C-NMR spectrum thus measured is analyzed in accordance with proposals of Lindemann Adams (Analysis Chemistry 43, p. 1245 (1971)) and J. C. Randall (Review Macromolecular Chemistry Physics, C29, 201 (1989)), to determine a Tαβ/(Tαβ+Tαα) intensity ratio.

When the copolymer satisfies the above relational expression (e-1), the lamella thickness distribution is narrowed.

In the ethylene copolymers (A-1) to (A-3), the regio-regularity of the α-olefin of 3 to 20 carbon atoms, as measured by $^{13}$C-NMR, preferably further satisfies the following expression (e-2):

$$T\beta\gamma/(T\beta\gamma+T\beta\beta) \leq 0.30-0.0015 \times x \qquad (e\text{-}2)$$

wherein Tβγ is a peak intensity of a carbon atom having branches at the β-position and the γ-position in the $^{13}$C-NMR spectrum, Tββ is a peak intensity of a carbon atom having branches at both of the β-positions, and x is an ethylene content (% by mol) in the polymer.

The above values are measured by $^{13}$C-NMR similarly to the Tαβ and Tαα values.

When the copolymer satisfies the above relational expression (e-2), the lamella thickness distribution is narrowed.

Although the lower limit of the molecular weight distribution (Mw/Mn) of the ethylene copolymers (A-1) to (A-3), as measured by GPC, is not specifically restricted, it is preferably not less than 1.2, more preferably not less than 1.6, still more preferably not less than 1.7. Likewise, the upper limit thereof is not specifically restricted, but it is preferably not more than 10, particularly preferably not more than 3, more preferably not more than 2.9.

For example, the molecular weight distribution (Mw/Mn) of the ethylene copolymers (A-1) to (A-3), as measured by GPC, is in the range of 1.2 to 10, preferably 1.2 to 3.0, more preferably 1.6 to 2.9.

The weight-average molecular weight (Mw) and the number-average molecular weight (Mn) were measured using orthochlorobenzene as a solvent at a temperature of 140° C.

When Mw/Mn is in the above range, the copolymer is excellent in moldability and mechanical properties. Although the weight-average molecular weight of the ethylene copolymers (A-1) to (A-3) of the invention is not specifically restricted, it is desired to be in the range of 1,000 to 10,000,000, preferably 1,000 to 1,000,000, more preferably 10,000 to 100,000.

The ethylene copolymers (A-1) to (A-3) preferably further satisfy the following relational expression (f):

$$MI10/MI2 < (Mw/Mn) + 5.55 \qquad (f)$$

wherein MI10 is a melt index as measured at 190° C. under a load of 10 kg, and MI2 is a melt index as measured at 190° C. under a load of 2.16 kg.

The ethylene copolymers preferably further satisfy the following relational expression (g):

$$MI2 > 19.009 \times (\eta)^{-5.2486} \qquad (g)$$

When an ethylene copolymer satisfies the above relational expressions (f) and (g), the copolymer has a feature that the amount of long chain branches in the copolymer is small. Such a copolymer is more excellent in mechanical properties such as strength, and therefore, the copolymer is particularly useful for various molded articles or resin modifiers.

The ethylene copolymers (A-1) to (A-3) are desired to further have an ash content of not more than 1000 ppm, preferably not more than 300 ppm, more preferably not more than 100 ppm.

The ash content means a component remaining in an ethylene copolymer after calcining of the copolymer, and usually is a residue of a metallic catalyst used in the polymerization. Specific examples thereof include a titanium compound, a zirconium compound, an aluminum compound, a magnesium compound and a zinc compound.

When the ash content is in the above range, the polymer has good transparency because of a small amount of a metallic component contained in the polymer. When the ash content exceeds 1000 ppm, the polymer cannot be practically used occasionally because of a large amount of a metallic component contained in the polymer.

When a titanium element and/or a zirconium element is contained as the ash content in the ethylene copolymers (A-1) to (A-3), the amount of the titanium element and/or the zirconium element is desired to be not more than 10 ppm, preferably not more than 5 ppm, more preferably not more than 3 ppm.

The ethylene copolymers (A-1) to (A-3) are each preferably a copolymer prepared without contact of the reaction solution with water and/or an alcohol in an amount of not less than 1/10, preferably not less than 1/100, of the weight of the copolymer in a solution state or a semi-precipitation state. In the preparation of such an ethylene copolymer, equipment necessary for removing a solvent and water and/or an alcohol used in the preparation process can be simplified, and hence the cost is low. When a copolymer is prepared by the later-described process, the resulting copolymer has a low ash content even if the reaction solution is not contacted with water, an alcohol, etc.

The ethylene copolymers (A-1) to (A-3) are each preferably a copolymer prepared by forming not less than 50%, preferably not less than 80%, of chain transfer by the addition of hydrogen. In such an ethylene copolymer, the number of terminal vinyl groups and vinylidene groups is small, and any special chain transfer agent is not used, so that the copolymer can be prepared at a low cost.

The process for preparing the ethylene copolymers (A-1) to (A-3) is not specifically restricted, provided that the process is capable of preparing a copolymer having the above properties. For example, available is a process comprising copolymerizing ethylene and an α-olefin of 3 to 20 carbon atoms in a solution state or a semi-precipitation state using a supported catalyst prepared from (i) a carrier substance, (ii) an organoaluminum compound, (iii) a borate compound having active hydrogen, and (iv) a transition metal compound π-bonded to a cyclopentadienyl or substituted cyclopentadienyl group.

The process for preparing the ethylene copolymer of the invention is described below.

Process for Preparing Ethylene Copolymer
Preparation Process

The ethylene copolymer of the invention is prepared by, for example, copolymerizing or random copolymerizing ethylene, an α-olefin of 3 to 20 carbon atoms, and if necessary, a cycloolefin in the presence of the following transition metal compound (a) (sometimes referred to as a "metallocene compound").

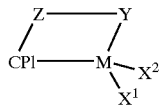

In the formula (I), M is a transition metal of Group 4 or lanthanide series of the periodic table, specifically Ti, Zr, Hf, Nd, Sm or Ru, preferably Ti, Zr or Hf; Cpl is a cyclopentadienyl group, an indenyl group, a fluorenyl group or a derivative group thereof, which is π-bonded to M; $X^1$ and $X^2$ are each an anionic ligand or a neutral Lewis base ligand; Y is a ligand containing a nitrogen atom, an oxygen atom, a phosphorus atom or a sulfur atom; and Z is carbon, oxygen, sulfur, boron or an element of Group 14 of the periodic table (e.g., silicon, germanium or tin), preferably any one of carbon, oxygen and silicon, and Z may have a substituent.

Z and Y may together form a condensed ring.

In more detail, Cpl is a ligand coordinated to the transition metal and is a ligand having cyclopentadienyl skeleton, such as a cyclopentadienyl group, an indenyl group, a fluorenyl group or a derivative group thereof. The ligand having cyclopentadienyl skeleton may have a substituent, such as an alkyl group, a cycloalkyl group, a trialkylsilyl group or a halogen atom.

Z is an atom selected from C, O, B, S, Ge, Si and Sn, and may have a substituent such as an alkyl group or an alkoxy group. The substituents of Z may be bonded to form a ring.

$X^1$ and $X^2$ are each an anionic ligand or a neutral Lewis base ligand, may be the same or different, and are each a hydrogen atom, a halogen atom or a hydrocarbon, silyl or germyl group having 20 or less carbon atoms, silicon atoms or germanium atoms.

Examples of the compounds represented by the formula (I) include:
    (dimethyl(t-butylamido)(tetramethyl-$\eta^5$-cyclopentadienyl)silylene)titanium dichloride,
    ((t-butylamido)(tetramethyl-$\eta^5$-cyclopentadienyl)-1,2-ethanediyl)titanium dichloride,
    (dimethyl(phenylamido)(tetramethyl-$\eta^5$-cyclopentadienyl)silylene)titanium dichloride,
    (dimethyl(t-butylamido)(tetramethyl-$\eta^5$-cyclopentadienyl)silylene)titanium dimethyl,
    (dimethyl(4-methylphenylamido)(tetramethyl-$\eta^5$-cyclopentadienyl)silylene)titanium dichloride,
    (dimethyl(t-butylamido)($\eta^5$-cyclopentadienyl)silylene) titanium dichloride, and
    (tetramethyl(t-butylamido)(tetramethyl-$\eta^5$-cyclopentadienyl)disilylene)titanium dichloride, When the transition metal compound (a) is used as a catalyst, the following compounds are used as co-catalysts together with the transition metal compound (a);
    (b) a compound which can react with the transition metal M of the transition metal compound (a) to form an ionic complex (also referred to as an "ionizing ionic compound"), and
    (c) an organoaluminum oxy-compound.

Examples of the ionizing ionic compounds (b) include Lewis acid, an ionic compound, a borane compound and a carborane compound.

The Lewis acid is, for example, a compound represented by $BR_3$ (R is a phenyl group which may have a substituent, such as a fluorine atom, a methyl group or a trifluoromethyl group, or a fluorine atom), and specific examples thereof include trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron and tris(3,5-dimethylphenyl)boron.

The ionic compound is, for example, a trialkyl-substituted ammonium salt, a N,N-dialkylanilinium salt, a dialkylammonium salt or a triarylphosphonium salt. Examples of the trialkyl-substituted ammonium salts include triethylammoniumtetra(phenyl)boron, tripropylammoniumtetra(phenyl)boron and tri(n-butyl) ammoniumtetra (phenyl)boron. Examples of the dialkylammonium salts include di(1-propyl)ammoniumtetra(pentafluorophenyl)boron and dicyclohexylammoniumtetra(phenyl)boron.

Also available as the ionic compounds are triphenylcarbeniumtetrakis(pentafluorophenyl)borate, N,N-dimethylaniliniumtetrakis(pentafluorophenyl)borate and ferroceniumtetra(pentafluorophenyl)borate.

Examples of the borane compounds include salts of metallic borane anions, such as decaborane(14), bis(tri(n-butyl)ammonium)nonaborate, bis(tri(n-butyl)ammonium) decaborate and bis(tri(n-butyl)ammonium)bis(dodecahydridododecaborate) nickelate(III).

Examples of the carborane compounds include salts of metallic carborane anions, such as 4-carbanonaborane(14), 1,3-dicarbanonaborane(13), bis(tri (n-butyl)ammonium)bis(undecahydrido-7-carbaundecab orate) nickelate(IV).

The above compounds (b) are used singly or in combination of two or more kinds.

The organoaluminum oxy-compound (alumoxane) (c) may be conventional aluminoxane or may be such a benzene-insoluble organoaluminum oxy-compound as exemplified in Japanese Patent Laid-Open Publication No. 78687/1990.

The conventional aluminoxane (alumoxane) is specifically represented by the following formulas.

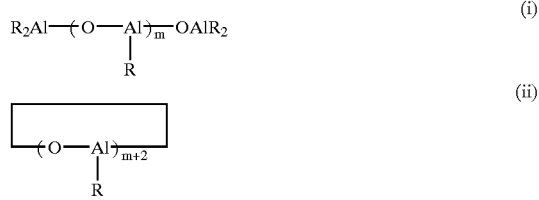

In the above formulas, R is a hydrocarbon group, such as methyl, ethyl, propyl or butyl, preferably methyl or ethyl, particularly preferably methyl.

m is an integer of 2 or greater, preferably an integer of 5 to 40.

The aluminoxane may be formed from mixed alkyloxy-aluminum units consisting of alkyloxyaluminum units represented by the formula (OAl ($R^1$)) and alkyloxyaluminum units represented by the formula (OAl ($R^2$)) ($R^1$ and $R^2$ are each the same hydrocarbon group as R, and $R^1$ and $R^2$ are groups different from each other).

The ionizing ionic compound (b) or the organoaluminum oxy-compound (c) maybe used as a supported form on a particulate carrier.

When the transition metal compound (a) is used as a catalyst, any one of ionizing ionic compound (b) and the organoaluminum oxy-compound (c) has only to be used in combination, but it is preferable to use both of the ionizing ionic compound (b) and the organoaluminum oxy-compound (c) together with the transition metal compound (a).

Together with the organoaluminum oxy-compound and/or the ionizing ionic compound, an organoaluminum compound (d) may be used, if necessary.

As the organoaluminum compound, a compound having at least one Al-carbon bond in a molecule is employable. Such a compound is, for example, an organoaluminum compound represented by the following formula:

$(R^1)_m Al(O(R^2))_n H_p X_q$ wherein $R^1$ and $R^2$ may be the same or different and are each a hydrocarbon group of usually 1 to 15 carbon atoms, preferably 1 to 4 carbon atoms, X is a halogen atom, and m, n, p and q are numbers satisfying the conditions of $1 < m \leq 3$, $0 \leq n < 3$, $0 \leq p < 3$, $0 \leq q < 3$ and $m+n+p+q=3$.

In the present invention, ethylene, an α-olefin of 3 to 20 carbon atoms, and if necessary, a cycloolefin are copolymerized in the presence of preferably the above-described metallocene catalyst. The reaction phase for the copolymerization is not specifically restricted, but for example, it is desirable to carry out the copolymerization in a solution state, and in this case a hydrocarbon solvent is usually used. An α-olefin may be used as a solvent. The copolymerization can be carried out by any of batchwise and continuous processes.

When the copolymerization is carried out batchwise using the aforesaid metallocene catalyst, the concentration of the metallocene compound in the polymerization system is in the range of usually 0.00005 to 1 mmol, preferably 0.0001 to 0.5 mmol, based on 1 liter of the polymerization volume.

The organoaluminum oxy-compound is used in such an amount that the molar ratio (Al/M) of the aluminum atom (Al) to the transition metal atom (M) in the metallocene compound becomes 1 to 10000, preferably 10 to 5000.

The ionizing ionic compound is used in such an amount that the molar ratio of the ionizing ionic compound to the metallocene compound (ionizing ionic compound/metallocene compound) becomes 0.5 to 20, preferably 1 to 10.

The organoaluminum compound is used in an amount of usually about 0 to 5 mmol, preferably about 0 to 2 mmol, based on 1 liter of the polymerization volume.

It is preferable to carry out the copolymerization reaction at a temperature as low as possible under such conditions as maintain the polymer in a solution state. For example, the reaction is carried out at a temperature of not lower than −78° C. and lower than 20° C. The temperature is preferably as low as possible. When the copolymerization is carried out at such a temperature, the amount of vinyl groups and vinylidene groups present at the molecular ends of the polymer can be decreased. The pressure is desired to be more than 0 kg/cm² and not more than 80 kg/cm², preferably more than 0 kg/cm² and not more than 50 kg/cm².

Although the reaction time (average residence time in case of continuous copolymerization) varies depending upon the conditions such as catalyst concentration and polymerization temperature, it is in the range of usually 5 minutes to 3 hours, preferably 10 minutes to 1.5 hours.

To the polymerization system, ethylene, an α-olefin of 3 to 20 carbon atoms, and if necessary, a cycloolefin are fed in such amounts that a copolymer of the aforesaid specific composition can be obtained. In the copolymerization, a molecular weight modifier is used, if desired. Examples of the molecular weight modifiers include hydrogen, alkyl metals and alkyl silicon. In order to obtain a copolymer containing small quantities of vinyl groups and vinylidene groups at a low cost, hydrogen is suitable. There is no specific limitation on the amount of hydrogen, but in order that not less than 50% of chain transfer is formed by the addition of hydrogen molecules to prepare the ethylene copolymer, not less than 0.5 mol of hydrogen is necessary based on 1 mol of the saturated molecule-terminated polymer. The amount of hydrogen is preferably in the range of 2 to 1000 mol. When hydrogen is added in the above amount under such catalyst/preparation conditions that the chain transfer is mainly attributed to hydrogen addition type chain transfer, an ethylene copolymer having small quantities of vinyl groups and vinylidene groups present at the molecular ends can be obtained.

For example, under the aforesaid catalyst system and preparation conditions but using no molecular weight modifier (hydrogen), an ethylene/α-olefin copolymer is prepared to grasp the yield of the copolymer.

On the other hand, based on the molecular weight of the ethylene/α-olefin copolymer of the invention which is to be prepared, the amount of the molecular ends is estimated, and based on the estimated value, a molecular weight modifier (hydrogen) is added in an amount within the above range, whereby a specific ethylene/α-olefin copolymer can be prepared.

The ethylene copolymer of the invention can be used singly or as a mixture.

If desired, the ethylene copolymer of the invention may be used as a blend or an alloy with other polymers or inorganic materials such as filler and talc. Further, the copolymer of the invention may be modified by the use of generally known modification technique. For example, an unsaturated carboxylic acid such as maleic anhydride is employable. Moreover, additives, such as antioxidant, light resisting agent and release agent, may be added.

The ethylene polymer of the invention is molded by known molding methods, such as injection molding, blow molding, pipe molding, film molding and compression molding.

The ethylene copolymer of the invention can be used for various molded products, particularly films and sheets. Further, the ethylene copolymer can be used as a resin modifier.

More specifically, the copolymer of the invention can be used for packing materials of waterproof sheet, rush mat and carpet; building and civil engineering pipes, such as floor heating pipe, gas pipe and tap water pipe; medical purposes, such as wound protective film, poultice film and catheter; daily use articles, such as melt blown (nonwoven fabric), spun bond (nonwoven fabric), packaging tube, air bag, sky shoes and sandals; and industrial purposes, such as water spray hose and protective film.

Next, the ethylene copolymer composition of the invention is described. The ethylene copolymer composition of the invention comprises at least one polymer selected from the ethylene copolymers (A-1) to (A-3) and another thermoplastic polymer.

Examples of the thermoplastic polymers include polyolefins other than the above ethylene copolymers (e.g., polyethylene having a density of not less than 0.900 g/cm$^3$, other ethylene copolymers having a density of less than 0.900 g/cm$^3$ and satisfying the scope of claims of the invention, ethylene copolymers having a density of less than 0.900 g/cm$^3$ and not satisfying the scope of claims of the invention, a propylene homopolymer, a random copolymer of propylene and at least one α-olefin selected from α-olefins of 2 and 4 or more carbon atoms, a block copolymer of propylene and at least one α-olefin selected from α-olefins of 2 and 4 or more carbon atoms, a 1-butene homopolymer, and a copolymer of 1-butene and at least one α-olefin selected from α-olefins of 2 to 3 and 5 or more carbon atoms), polyamides, polyesters, polycarbonates, polyacetals and polystyrenes.

As the thermoplastic polymer, a polyolefin such as polypropylene is preferable. Particularly preferable is a propylene homopolymer, a random copolymer of propylene and at least one α-olefin selected from α-olefins of 2 and 4 or more carbon atoms, or a block copolymer of propylene and at least one α-olefin selected from α-olefins of 2 and 4 or more carbon atoms.

In the ethylene copolymer composition of the invention, the weight ratio of the ethylene polymer to the thermoplastic polymer is in the range of 0.01/99.99 to 99.99/0.01, preferably 0.01/99.99 to 50/50, more preferably 0.01/99.99 to 40/60.

The ethylene copolymer composition of the invention is molded by known molding methods, such as injection molding, blow molding, pipe molding, film molding and compression molding.

The ethylene copolymer composition of the invention can be used for various molded products, particularly films and sheets.

More specifically, the ethylene copolymer composition of the invention can be used for packing materials of waterproof sheet, rush mat and carpet; building and civil engineering pipes, such as floor heating pipe, gas pipe and tap water pipe; medical purposes, such as wound protective film, poultice film and catheter; daily use articles, such as melt blown, spun bond, packaging tube, air bag, sky shoes and sandals; and industrial purposes, such as water spray hose and protective film.

EFFECT OF THE INVENTION

The ethylene copolymer of the invention has a melt index, a density, a vinyl group amount and a vinylidene group amount in the specific ranges, and hence the copolymer is excellent in mechanical properties, molding processability, heat stability in the molding process and heat aging resistance.

The ethylene copolymer of the invention can be used for various molded products, particularly films and sheets, resin modifiers, and elastomeric products.

EXAMPLE

The present invention is further described with reference to the following examples, but it should be construed that the invention is in no way limited to those examples.

Example 1

Synthesis of ethylene copolymer

In a 1-liter glass separable flask equipped with a stirrer and thoroughly purged with nitrogen, 750 ml of heptane freed of impurities was placed at 23° C., and the glass separable flask was cooled to 10° C. with passing nitrogen. When the temperature became 10° C., passing of nitrogen was stopped, and instead, to the flask were fed hydrogen at a rate of 5 Nl/hr, ethylene at a rate of 85 Nl/hr and propylene at a rate of 15 Nl/hr. Then, 0.375 mmol of triisobutylaluminum was first introduced. Subsequently, 0.75 ml (0.0015 mmol) of a hexane solution of (t-butylamido)dimethyl (tetramethyl-$\eta^5$-cyclopentadienyl)silanetitanium dichloride (concentration: 0.002 mmol/ml) and 3.75 ml (corresponding to 0.015 mmol in terms of B atom) of a toluene mixed solution of $(C_6H_5)_3CB(C_6F_5)_4$-methylalumoxane (boron concentration: 0.004 mmol/ml, Al concentration: 0.012 mmol/ml) obtained by previously contacting $(C_6H_5)_3CB(C_6F_5)_4$ with methylalumoxane for 30 minutes were introduced separately from each other.

After introduction of the $(C_6H_5)_3CB(C_6F_5)_4$-methylalumoxane mixed solution, polymerization was conducted for 10 minutes at 10° C. After the specified time, 0.5 g of methanol was introduced into the glass separable flask to terminate the polymerization.

The polymerization solution was vacuum dried to obtain a copolymer.

The polymer thus obtained was measured on its MFR (load of 2.16 kg), density, vinyl group amount, vinylidene group amount and ($\eta$).

As a result, 14.7 g of an ethylene copolymer having a density of 0.862 g/cm³, MI2 of 320 g/10 min, (I) of 0.62, a vinyl group amount of less than 0.002 vinyl group/1000 carbon atoms, and a vinylidene group amount of less than 0.002 vinylidene group/1000 carbon atoms was obtained.

The results are set forth in Table 1.

The measurements were carried out in the following manner.

Melt index (MI2)

Using granulation pellets of a copolymer, a melt index was measured under the conditions of a temperature of 190° C. and a load of 2.16 kg in accordance with ASTM D1238-89.

Density

Using a hydraulic hot press (manufactured by Shindo Kinzoku Kogyo) preset at 170° C., a sheet of 0.5 mm thickness was prepared under a pressure of 100 kg/cm². Then, using a different hydraulic hot press preset at 200° C., the sheet was cooled by compressing it under a pressure of 100 kg/cm², to obtain a sample for the measurement. The pressed sheet was heat treated at 120° C. for 1 hour, then slowly cooled to room temperature over a period of 1 hour and measured on the density by a density gradient tube.

Intrinsic Viscosity (η)

A viscosity was measured in decalin at 135° C. in a concentration of about 1 mg/ml, and the intrinsic viscosity was determined by the following conversion:

$$(\eta) = \eta_{sp} \div (C(1+0.28\eta_{sp}))$$

wherein C is a solution concentration (g/dl), and $\eta_{sp}$ is a specific viscosity (-).

The vinyl group amount and the vinylidene group amount were measured by the aforesaid methods.

Example 2

Synthesis of Ethylene Copolymer

In a 1-liter glass separable flask equipped with a stirrer and thoroughly purged with nitrogen, 750 ml of heptane freed of impurities was placed at 23° C., and the glass separable flask was cooled to 10° C. with passing nitrogen. When the temperature became 10° C., passing of nitrogen was stopped, and instead, to the flask were fed hydrogen at a rate of 1 Nl/hr, ethylene at a rate of 85 Nl/hr and propylene at a rate of 15 Nl/hr.

Then, 0.375 mmol of triisobutylaluminum was first introduced. Subsequently, 0.1875 ml (0.000375 mmol) of a hexane solution of (t-butylamido)dimethyl(tetramethyl-η⁵-cyclopentadienyl)si lanetitanium dichloride (concentration: 0.002 mmol/ml) and 3.75 ml (corresponding to 0.015 mmol in terms of B atom) of a mixed solution of $(C_6H_5)_3CB(C_6F_5)_4$-methylalumoxane (boron concentration: 0.004 mmol/ml, Al concentration: 0.012 mmol/ml) obtained by previously contacting $(C_6H_5)_3CB(C_6F_5)_4$ with methylalumoxane for 30 minutes were introduced separately from each other.

After introduction of the toluene mixed solution of $(C_6H_5)_3CB(C_6F_5)_4$-methylalumoxane, polymerization was conducted for 10 minutes at 10° C. After the specified time, 0.5 g of methanol was introduced into the glass separable flask to terminate the polymerization.

The polymerization solution was vacuum dried to obtain a polymer.

That is, 10.4 g of an ethylene copolymer having a density of 0.858 g/cm³, MI2 (load of 2.16 kg) of 1.1 g/10 min, MI10 (load of 10 kg) of 8.0 g/10 min, (η) of 1.93, a vinyl group amount of less than 0.002 vinyl group/1000 carbon atoms, a vinylidene group amount of less than 0.002 vinylidene group/1000 carbon atoms, Mw/Mn of 2.1, an ethylene content of 72.4% by mol, $T\alpha\beta/(T\alpha\beta+T\alpha\alpha)$ of 0.058 and $T\beta\gamma/(T\beta\gamma+T\beta\beta)$ of 0.087 was obtained.

Comparative Example 1

Synthesis of Ethylene Copolymer

In a 1-liter glass separable flask equipped with a stirrer and thoroughly purged with nitrogen, 750 ml of heptane freed of impurities was placed at 23° C., and the glass separable flask was cooled to 10° C. with passing nitrogen. When the temperature became 10° C., passing of nitrogen was stopped, and instead, to the flask were fed hydrogen at a rate of 0.25 Nl/hr, ethylene at a rate of 30 Nl/hr and propylene at a rate of 70 Nl/hr. Then, 0.375 mmol of triisobutylaluminum was first introduced. Subsequently, 4.5 ml (0.045 mmol) of a toluene solution of dicyclopentadienylzirconium dichloride (concentration: 0.01 mmol/ml) and 22.5 ml (0.09 mmol) of a toluene solution of $(C_6H_5)_3CB(C_6F_5)_4$ (concentration: 0.004 mmol/ml) were introduced separately from each other.

After introduction of the $(C_6H_5)_3CB(C_6F_5)_4$ solution, polymerization was conducted for 10 minutes at 10° C. After the specified time, 0.5 g of methanol was introduced into the glass separable flask to terminate the polymerization.

The polymerization solution was vacuum dried.

As a result, 5.1 g of an ethylene copolymer having a density of 0.860 g/cm³, MI2 of 1.8 g/10 min, (η) of 1.73, a vinyl group amount of 0.064 vinyl group/1000 carbon atoms, and a vinylidene group amount of 0.0092 vinylidene group/1000 carbon atoms was obtained.

The results are set forth in Table 1.

TABLE 1

|  | Ex. 1 | Ex. 2 | Comp. Ex. 1 |
|---|---|---|---|
| Catalyst | (t-butylamido)dimethyl (tetramethyl-η⁵-cyclopentadienyl) silanetitanium-dichloride | (t-butylamido)dimethyl (tetramethyl-η⁵-cyclopentadienyl) silanetitanium-dichloride | Dicyclopentadienyl-zirconium dichloride |
| Co-catalyst | $(C_6H_5)_3CB(C_6F_5)_4$-methylalumoxane | $(C_6H_5)_3CB(C_6F_5)_4$-methylalumoxane | $(C_6H_5)_3CB(C_6F_5)_4$ |
| Density (g/cm³) | 0.862 | 0.858 | 0.860 |
| MI (g/10 min) | 320 | 1.1 | 1.7 |
| Vinyl group amount Number of vinyl groups/1000 carbon atoms | less than 0.002 | less than 0.002 | 0.064 |
| Vinylidene group amount Number of vinylidene groups/1000 carbon atoms | less than 0.002 | less than 0.002 | 0.092 |

What is claimed is:

1. An ethylene copolymer which is a copolymer of ethylene and an α-olefin of 3 to 20 carbon atoms and has the following properties:
   (a) the melt index (MI2) at 190° C. under a load of 2.16 kg is in the range of 0.0001 to 1000 g/10 min,
   (b) the density is not more than 0.899 g/cm$^3$,
   (c) the relationship between a vinyl group amount and MI2 of the polymer satisfies the following expressions:

(vinyl group amount: number of vinyl groups/1000 carbon atoms)≦0.004509+0.000815×log (MI2), and
   (d) the relationship between a vinylidene group amount and MI2 of the polymer satisfies the following expressions:

(vinylidene group amount: number of vinylidene groups/1000 carbon atoms)≦0.013528+0.002445×log (MI2).

2. An ethylene copolymer which is a copolymer of ethylene and an α-olefin of 3 to 20 carbon atoms and has the following properties:
   (a) the melt index (MI2) at 190° C. under a load of 2.16 kg is in the range of 0.0001 to 1000 g/10 min,
   (b) the density is in the range of 0.875 to 0.899 g/cm$^3$, and
   (c) the relationship between a vinyl group amount and MI2 of the polymer satisfies the following expression:

(vinyl group amount: number of vinyl groups/1000 carbon atoms)≦0.004509+0.000815×log (MI2).

3. An ethylene copolymer which is a copolymer of ethylene, an α-olefin of 3 to 20 carbon atoms and a cycloolefin and has the following properties:
   (a) the cycloolefin content is not less than 0.01% by mol,
   (b) the melt index (MI2) at 190° C. under a load of 2.16 kg is in the range of 0.0001 to 1000 g/10 min,
   (c) the relationship between a vinyl group amount and MI2 of the polymer satisfies the following expression:

(vinyl group amount: number of vinyl groups/1000 carbon atoms)≦0.018038+0.003259×log (MI2), and
   (d) the relationship between a vinylidene group amount and MI2 of the polymer satisfies the following expression:

(vinylidene group amount: number of vinylidene groups/1000 carbon atoms)≦0.018038+0.003259×log (MI2).

4. The ethylene copolymer as claimed in claim 3, wherein the ethylene copolymer further has the following properties:
   the relationship between a vinyl group amount and MI2 of the polymer satisfies the following expression:

(vinyl group amount: number of vinyl groups/1000 carbon atoms)≦0.004509+0.000815×log (MI2), and
   the relationship between a vinylidene group amount and MI2 of the polymer satisfies the following expression:

(vinylidene group amount: number of vinylidene groups/1000 carbon atoms)≦0.013528+0.002445×log (MI2).

5. The ethylene copolymer as claimed in any one of claims 1 to 4, wherein regio-regularity of the α-olefin of 3 to 20 carbon atoms, as measured by $^{13}$C-NMR, satisfies the following expression:

$$Tαβ/(Tαβ+Tαα)≦0.25-0.0020x$$

wherein Tαβ is a peak intensity of a carbon atom having branches at the α-position and the β-position in the $^{13}$C-NMR spectrum, Tαα is a peak intensity of a carbon atom having branches at both of the α-positions, and x is an ethylene content (% by mol) in the polymer.

6. The ethylene copolymer as claimed in claim 1, wherein regio-regularity of the α-olefin of 3 to 20 carbon atoms, as measured by $^{13}$C-NMR, satisfies the following expression:

$$Tβγ/(Tβγ+Tββ)≦0.30-0.0015x$$

wherein Tβγ is a peak intensity of a carbon atom having branches at the β-position and the γ-position in the $^{13}$C-NMR spectrum, Tββ is a peak intensity of a carbon atom having branches at both of the β-positions, and x is an ethylene content (% by mol) in the polymer.

7. The ethylene copolymer as claimed in claim 1, wherein the molecular weight distribution (Mw/Mn), as measured by GPC, is in the range of 1.2 to 10.

8. The ethylene copolymer as claimed in claim 1, wherein the molecular weight distribution (Mw/Mn), as measured by GPC, is in the range of 1.6 to 10.

9. The ethylene copolymer as claimed in claim 1, which satisfies the expression MI10/MI2<(Mw/Mn)+5.55.

10. The ethylene copolymer as claimed in claim 1, which satisfies the expression MI2>19.009x(θ)$^-$5.2486 where θ is intrinsic viscosity determined by the formula θ=θ$_{SP}$/(C(1+0.28θ$_{SP}$)) where θ$_{SP}$ is specific viscosity and C is solution concentration g/dl as measured in decalin at 135° C. at a concentration of about 1 mg/ml.

11. The ethylene copolymer as claimed in claim 1, wherein the ash content in the ethylene copolymer is not more than 1000 ppm.

12. The ethylene copolymer as claimed in claim 1, wherein the titanium element content in the ethylene copolymer is not more than 10 ppm, and/or the zirconium element content in the ethylene copolymer is not more than 10 ppm.

13. The ethylene copolymer as claimed in claim 1, which is a copolymer prepared by forming not less than 50% of chain transfer by the addition of hydrogen.

14. A molded product comprising the ethylene copolymer of claim 1.

15. A resin modifier comprising the ethylene copolymer of claim 1.

16. A composition comprising the ethylene copolymer of claim 1, optionally together with a thermoplastic polymer.

17. The composition as claimed in claim 16, wherein the thermoplastic polymer is a polyolefin.

18. The composition as claimed in claim 16, wherein the weight ratio of the ethylene copolymer to the thermoplastic polymer is in the range of 0.01/99.99 to 99.99/0.01.

19. A molded product comprising the ethylene copolymer composition of claim 16.

20. An ethylene copolymer which is a copolymer of ethylene and an α-olefin of 3 to 20 carbon atoms and has the following properties:
   (a) the melt index (MI2) at 190° C. under a load of 2.16 kg is in the range of 0.0001 to 1000 g/10 min,
   (b) the density is not more than 0.899 g/cm$^3$, (c) the relationship between a vinyl group amount and NI2 of the polymer satisfies the following expression:

(vinyl group amount: number of vinyl groups/1000 carbon atoms)≦0.018038+0.003259×log (MI2), (H12), and (d) the relationship between a vinylidene group amount and MI2 of the polymer satisfies the following expression:

(vinylidene group amount: number of vinylidene groups/1000 carbon atoms)≦0.018038+0.003259×log (MI2), and wherein the ash content in the ethylene copolymer is not more than 1000 ppm.

21. An ethylene copolymer which is a copolymer of ethylene and an α-olefin of 3 to 20 carbon atoms and has the following properties:

(a) the melt index (MI2) at 190° C. under a load of 2.16 kg is in the range of 0.0001 to 1000 g/10 min, (b) the density is not more than 0.899 g/cm³, (c) the relationship between a vinyl group amount and MI2 of the polymer satisfies the following expression:

(vinyl group amount: number of vinyl groups/1000 carbon atoms)≦0.018038+0.003259×log (MI2)

and (d) the relationship between a vinylidene group amount and MI2 of the polymer satisfies the following expression:

(vinylidene group amount: number of vinylidene groups/1000 carbon atoms)≦0.018038+0.003259×log (MI2), and wherein the titanium element content in the ethylene copolymer is not more than 10 ppm, and/or the zirconium element content in the ethylene copolymer is not more than 10 ppm.

22. An ethylene copolymer which is a copolymer of ethylene and an α-olefin of 3 to 20 carbon atoms and has the following properties:

(a) the melt index (MI2) at 190° C. under a load of 2.16 kg is in the range of 0.0001 to 1000 g/10 min, (b) the density is not more than 0.899 g/cm³, (c) the relationship between a vinyl group amount and MI2 of the polymer satisfies the following expression:

(vinyl group amount: number of vinyl groups/1000 carbon atoms)≦0.018038+0.003259×log (MI2), and (d) the relationship between a vinylidene group amount and MI2 of the polymer satisfies the following expression:

(vinylidene group amount: number of vinylidene groups/1000 carbon atoms)≦0.018038+0.003259×log (MI2), which is a copolymer prepared by forming not less than 50% of chain transfer by the addition of hydrogen.

* * * * *